(12) United States Patent
Madama et al.

(10) Patent No.: US 7,743,786 B2
(45) Date of Patent: Jun. 29, 2010

(54) IRRIGATION SYSTEM AND SHUT-OFF CONTROL DEVICE THEREFOR

(76) Inventors: Carol E. Madama, 1300 SW. 13th Pl., Boca Raton, FL (US) 33486; Edward James Magi, 1401 Village Blvd., West Palm Beach, FL (US) 33409

(*) Notice: Subject to any disclaimer, the term of this patent is extended or adjusted under 35 U.S.C. 154(b) by 542 days.

(21) Appl. No.: 11/727,011

(22) Filed: Mar. 23, 2007

(65) Prior Publication Data
US 2008/0230131 A1 Sep. 25, 2008

(51) Int. Cl.
*F16K 17/28* (2006.01)
(52) U.S. Cl. .................. 137/460; 137/517; 137/533.11; 137/843
(58) Field of Classification Search ................. 137/460, 137/517, 533.11, 843
See application file for complete search history.

(56) References Cited
U.S. PATENT DOCUMENTS

| | | | |
|---|---|---|---|
| 3,077,204 A * | 2/1963 | Bennett et al. .............. 137/843 |
| 3,498,315 A * | 3/1970 | Hester et al. ........... 137/533.11 |
| 6,595,230 B2 * | 7/2003 | Raboin .......................... 137/1 |
| 6,899,127 B1 * | 5/2005 | Swingley ............... 137/533.11 |
| 7,051,951 B2 * | 5/2006 | Magi et al. .................. 239/201 |
| 2005/0098662 A1 * | 5/2005 | Magi et al. .................. 239/570 |

* cited by examiner

*Primary Examiner*—Stephen Hepperle
(74) *Attorney, Agent, or Firm*—Welsh & Flaxman LLC

(57) ABSTRACT

An irrigation system having at least one water distribution member, a water supply source and a horizontally oriented, shut-off control device located in a fluid flow line between a water supply source and the at least one water distribution member for automatically shutting off the flow of supply water to the at least one water distribution member in response to a predetermined increase in force of fluid flow. The shut-off control device has a housing with an interior flow path having rails and projections dimensioned to support a compressible ball which moves within the housing and limits side-to-side motion or turbulence.

10 Claims, 2 Drawing Sheets

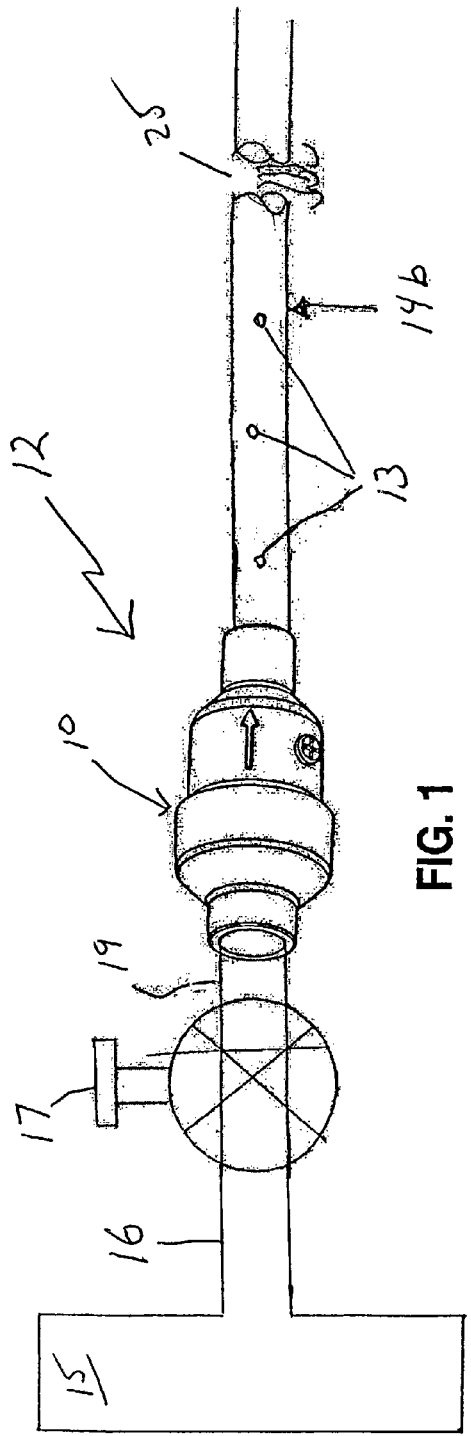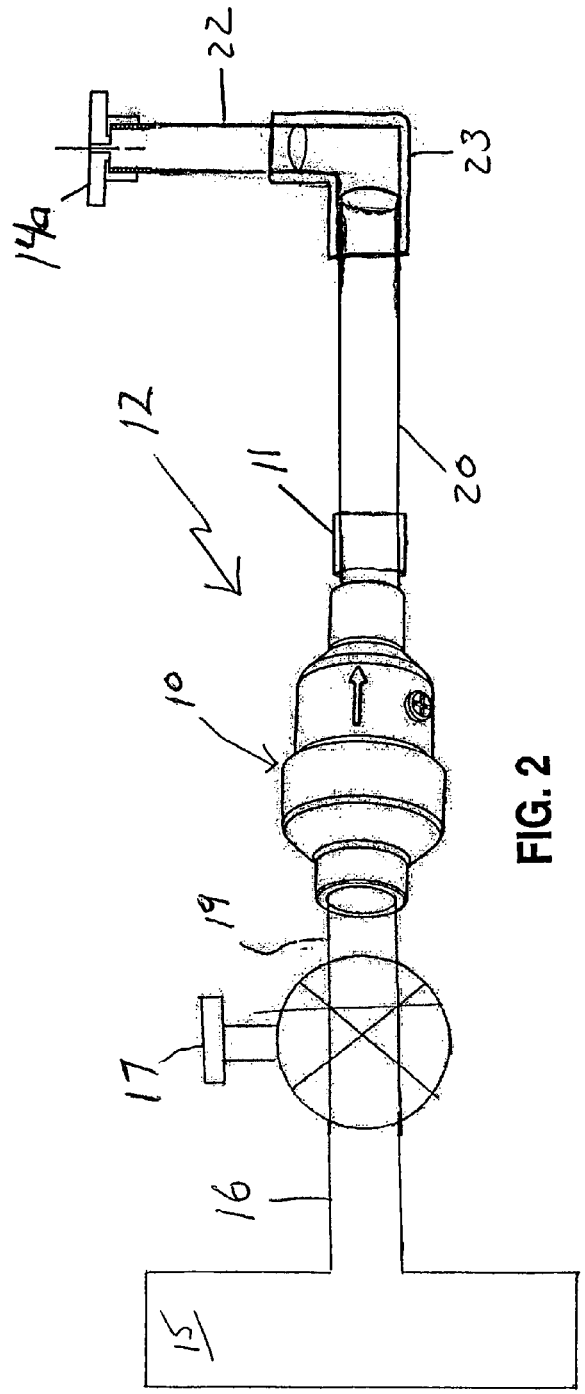

IRRIGATION SYSTEM AND SHUT-OFF CONTROL DEVICE THEREFOR

BACKGROUND OF THE INVENTION

1. Field of the Invention

The present invention relates to irrigation systems and more particularly to a horizontally oriented, in-line automatic shut-off control device placed upstream of a water distribution member to shut off and prevent water flow to the water distribution member in the event a malfunction or damage occurs to the water distribution member.

2. Description of the Prior Art

Lawn and grass areas are typically irrigated by in-ground sprinklers, which may or may not pop-up when water flows from a supply source. Most systems are automatically operated either by a timer or by some type of ground moisture sensing arrangement.

Conventional water distribution members in the form of sprinkler heads are prone to breakage for a variety of reasons. For example, sprinkler heads may be run over by lawn mowers or be stepped on by a person walking across the lawn.

Breaking one or more of the sprinkler heads results in the majority of the water in the system being disbursed through the broken heads, instead of all of the heads as programmed. This is not only a waste of water, but can be quite expensive in areas where water shortages are common. Water is a precious commodity in many areas, such as desert developments and the like. In addition, the area around the broken sprinkler head can be damaged by the excessive water flow to this area. With automated systems, breakage of a sprinkler head is often not detected until extensive damage occurs. Moreover, the entire system may be shut down until appropriate repair can be made, thus causing other areas in need of water to be damaged.

The inventors of the invention disclosed in U.S. Pat. No. 7,051,951 address these issues. However, it was found that applications wherein the shut-off control devices must be oriented horizontally or less than vertically presented additional problems. These problems are addressed by the present invention.

SUMMARY OF THE INVENTION

It is, therefore, an object of the present invention to provide a shut-off control device for a fluid flow line for automatically shutting off fluid flow in response to a predetermined increase in force of fluid flow. The shut-off control device includes a housing having an interior flow path having an inlet end and an outlet end, a valve seat located at the outlet end, a ball stop assembly located in the housing spaced between the inlet end and the outlet end, and a compressible ball located in the interior flow path in the housing. The compressible ball is positioned during normal operation behind the ball stop assembly at the inlet end. In use, a predetermined fluid flow force will cause the compressible ball to be compressed to a shape and size allowing the compressible ball to pass through an opening in the ball stop assembly and engage the valve seat at the outlet end stopping fluid flow through the shut-off control device. The housing includes an interior wall having inwardly projecting rails shaped and dimensioned to support the compressible ball as it moves within the housing by limiting side-to-side motion or the turbulence of the compressible ball to stabilize the compressible ball within the housing such that upon activation the compressible ball is stable and it can react as designed to shut-off the flow of water out of the shut-off control device.

It is also an object of the present invention to provide a shut-off control device wherein the ball stop assembly includes an adjustable stop member.

It is also another object of the present invention to provide a shut-off control device wherein the adjustable stop member extends through the housing from an exterior of the housing to an interior of the housing for adjustment thereof from the exterior of the housing.

It is also a further object of the present invention to provide a shut-off control device wherein the ball stop assembly further includes a plurality of projections.

It is still a further object of the present invention to provide a shut-off control device wherein each of the plurality of projections extends along an axis substantially parallel to the inwardly projecting tails.

It is yet a further object of the present invention to provide a shut-off control device wherein the housing includes a longitudinal axis which is horizontally oriented.

It is another object of the present invention to provide a shut-off control device wherein the inwardly projecting tails extend substantially an entire length of the housing.

It is also an object of the present invention to provide a shut-off control device wherein the housing is cylindrical.

It is also a further object of the present invention to provide an irrigation system including at least one water distribution member, a water supply source, a horizontally oriented, shut-off control device as discussed above located in a fluid flow line between a water supply source and the at least one water distribution member for automatically shutting off the flow of supply water to the at least one water distribution member in response to a predetermined increase in force of fluid flow.

It is still another object of the present invention to provide an irrigation system wherein the at least one water distribution member is a sprinkler.

It is yet another object of the present invention to provide an irrigation system wherein the at least one water distribution member is a drip hose.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a view of the control device of the present invention in use with a low volume drip hose irrigation system.

FIG. 2 is a view of the control device of the present invention in use with a sprinkler head irrigation system.

DESCRIPTION OF THE PREFERRED EMBODIMENT

Figure 3:
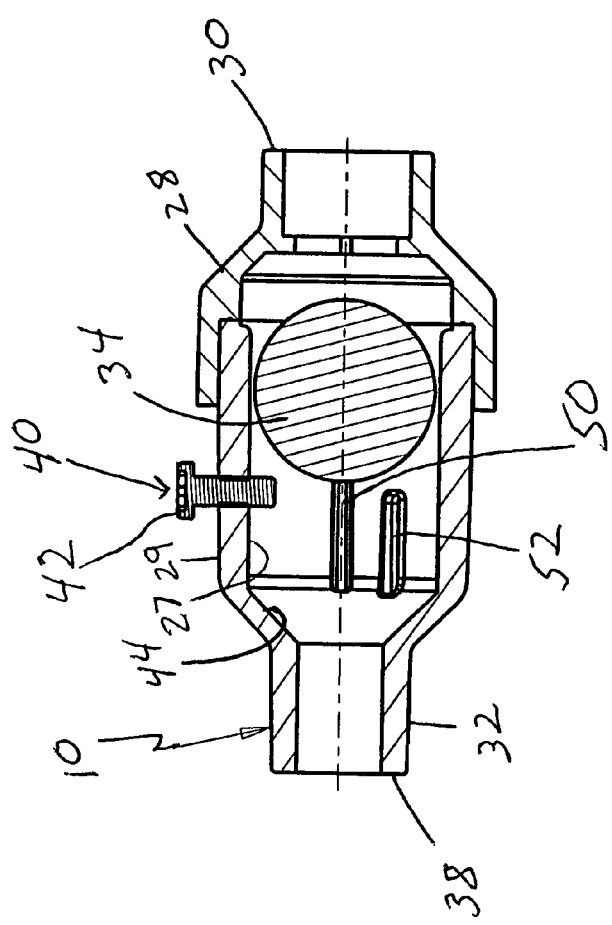
FIG. 3 is a cross-sectional view of the control device of the present invention.
Figure 4:
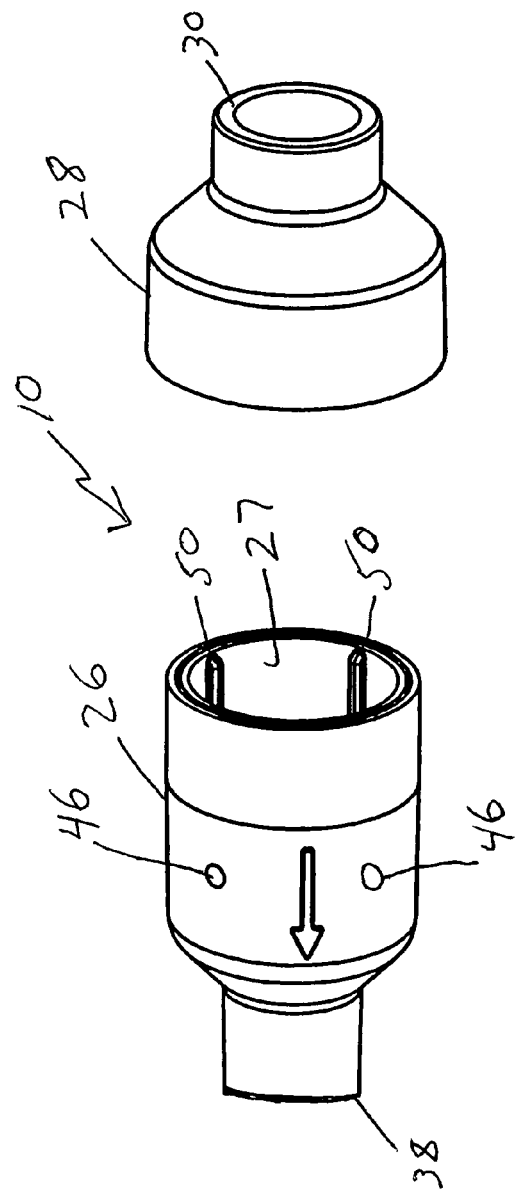
FIG. 4 is an exploded view of the control device of the present invention.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

FIGS. 1 to 4 illustrate an in-line shut-off control device 10 for a fluid flow line used horizontally in a lawn or landscaping irrigation system 12. As used herein, the shut-off control device 10 is specifically adapted for use in a horizontal orientation or less than vertical installation. With this in mind, those skilled in the art will appreciate that this is intended to mean that the longitudinal axis of the shut-off control device 10, that is, the axis line extending between the inlet end 30 and the outlet end 38 of the shut-off control device 10 is substantially horizontally oriented when the device is installed for use in accordance with the present invention. The irrigation system 12 generally includes a water distribution member, for example, sprinkler heads 14a and/or low volume drip hoses 14b connected via underground pipes to a water supply sources via supply lines and valves. The shut-off control device 10 provides an automatic shut off function in the event a water distribution member in the form of a sprinkler head 14a or low volume drip hose 14b is broken or removed.

It is contemplated numerous shut-off control devices will be used in association with numerous water distribution members in a typical irrigation system. In implementing such a system, one shut-off control device will preferably be associated with one water distribution member. However, those skilled in the art will appreciate one shut-off control device may be used in association with plural water distribution members without departing from the spirit of the present invention.

As illustrated in FIG. 1, the irrigation system 12 includes a water source 15 connected to a water supply line 16, which in turn is connected to a supply valve 17. The valve 17 is then connected via lower horizontal pipe 19 to a horizontally oriented shut-off control device 10 of the present invention. The shut-off control device 10 is connected to a water distribution member in the form of a low volume drip hose 14b often used for watering landscaping. The low volume drip hose 14b is shown to have a break 25 often caused by ground crews tending to the landscaping.

As illustrated in FIG. 2, the irrigation system 12 includes a water source 15 connected to a water supply line 16, which in turn is connected to a supply valve 17. The valve 17 is then connected via a lower horizontal pipe 19 to a horizontally oriented shut-off control device 10 of the present invention. The shut-off control device 10 is connected to a water distribution member in the form of a sprinkler head 14a often used for watering lawns.

In accordance with a preferred embodiment of the present invention, each sprinkler head 14a is attached to a threaded vertical riser pipe 22 or similar connecting structure. Those skilled in the art will appreciate the connection between components of the irrigation system 12 can be made via mating male and female threaded surfaces or glued together via various resins to create watertight seals. Threaded vertical riser pipe 22 is connected to an elbow 23 and then lower to horizontal pipe 20. In accordance with a preferred embodiment of the present invention, the sprinkler head 14a will generally be made from plastic, but other materials, such as various metals, may be used without departing from the spirit of the present invention. A second, lower horizontal pipe 19 is connected to the water supply line 16 using conventional valves and control systems to control water flow which, in turn, is connected to a water source 15.

The shut-off control device 10 is preferably connected between the outbound upper horizontal pipe 20 and the lower horizontal pipe 19 in a horizontal orientation so as to be located upstream of and beneath the sprinkler head 14a. The shut-off control device 10 is oriented horizontally within the ground and is generally located under the ground surface and in-line with the water supply flowing through the lower horizontal pipe 19 to the outbound upper horizontal pipe 20. In accordance with a preferred embodiment of the present invention, the upper and lower horizontal pipes 20, 19 are generally plastic, however, numerous suitable other materials, such as metal, could be used while staying within the spirit of the present invention.

The horizontal orientation of the shut-off control device 10 offers definite advantages by allowing placement of the water supply line 16 at minimal depths, which permits use in conjunction with low volume drip hose 14b. These low volume drip hoses 14b either lay directly on the surface of the landscaping or are slightly covered by mulch. The low volume drip hose 14b is simply a flexible hose that is perforated with holes 13 periodically along its length. As water runs through it, the holes 13 allow water to irrigate the surrounding bushes and trees. Typically, there is no grass in these landscape plots. To adequately protect the low volume drip hose 14b, the shut-off control device 10 is placed between the water supply, typically a meter or valve (at or close to the surface of the ground), and the low volume drip hose 14b. The ideal placement for the shut-off control device 10 is horizontal as this requires the least amount of soil excavation.

The present invention has been particularly designed to be used in a horizontal orientation, since a vertically oriented shut-off control device would require extensive excavation to account for all the turns necessary to take the water from a horizontal meter, to a device that is vertical, and then back to a horizontal low volume drip hose. Additionally, there are numerous applications wherein the water supply lines are too dose to the soil surface and only horizontal oriented shut-off control devices will be able to be buried in the soil.

As illustrated in FIG. 3, a cross-section of the shut-off control device 10 is shown. The shut-off control device 10 includes a cylindrical housing 26 defining an interior flow path and a removable cap 28 at one end thereof (in accordance with a preferred embodiment, at the inlet end 30 of the housing 26) that allows access to the interior of the housing 26. In accordance with a preferred embodiment of the present invention, the shut-off control device 10 and the cap 28 can be made from various materials, such as plastic and metals, although plastics are preferred. The opposite end (that is, the outlet end 38) of the cylindrical housing 26 includes an extension 32 for connection to the outbound upper horizontal pipe 20 or the low volume drip hose 14b. Located within the cylindrical housing 26 is a compressible ball 34 and a ball stop assembly 40 formed by at least one adjustable stop member 42 and static stop members composed of a plurality of static projections 52. The adjustable stop member 42 can be made from various materials, such as, plastics and metals, although plastics are preferred.

The extension 32 includes a valve seat 44 that cooperates with the compressible ball 34 to shut off water flow to the sprinkler head 14a or low volume drip hose 14b. The compressible ball 34 is positioned within the interior of the housing 26 and is freely moveable therein at the upstream end, or inlet end, 30 of the housing 26 behind the ball stop assembly 40. The size and type of the compressible ball 34 are determined by the size of the interior circumference of the housing 26 and opening defined by the adjustable stop member 42 and the static projections 52 as they extend into the housing 26 limiting the space for movement of the compressible ball 34.

The adjustable stop member 42 is a screw type device threaded into an aperture 46 in the housing side wall from the exterior wall 29 to the interior wall 27 of the housing 26. The distance adjustable stop member 42 extends within the interior of the housing 26 and is adjustable by merely turning the adjustable stop member 42. Thus, the adjustable stop member 42 can change the size of the opening for passage of the compressible ball 34 therethrough. The greater the distance the adjustable stop member 42 extends into the interior of housing 26, the larger the fluid flow force will need to be in order to compress and push the compressible ball 34 past the ball stop assembly 40 and into contact with the valve seat 44 as the size of the opening formed by the adjustable stop member 42 and the static projections 52 has been decreased. In accordance with a preferred embodiment of the present invention, the compressible ball 34 is made from rubber, however, any suitable material which compresses and is sized to seat within valve seat 44 could be used.

A ball stop assembly 40 having any number of static and adjustable stop members may be used in keeping within the spirit and scope of the present invention as defined by the appended claims.

It will be appreciated that the compressible ball 34 is designed to be maintained in the upstream location during normal operation of the sprinkler system 12 such that water flows around it and to the outbound upper horizontal pipe 20. As can be seen from the sectional view, there is sufficient space in the shut-off control device 10 to allow a sufficient amount of water flow to travel around the compressible ball 34 when located on the upstream side of the ball stop assembly 40 to operate the water distribution member in a normal manner.

It should be noted that if the space between the compressible ball 34 and the interior wall 27 is too large the shut-off control device 10 will not operate properly. That is, if too much water is permitted to flow between the compressible ball 34 and the interior wall 27 of the housing 26 during normal operation, then there would not be a sufficient change in the force of the fluid flow to force the compressible ball 34 past the ball stop assembly 40 should a break occur.

Controlled movement of the compressible ball 34 as the shut-off control device 10 is in a horizontal orientation is achieved by the inclusion of longitudinally extending circumferentially spaced, inwardly projecting rails 50 within the housing 26. The inwardly projecting rails 50 extend inwardly within the housing 26 and provide a guide surface for the compressible ball 34 maintained therein. By limiting the side-to-side motion and/or the turbulence of the compressible ball 34, the compressible ball 34 is stabilized within the housing 26. As a result, when the compressible ball 34 is called on to be activated, its condition is stable and it can react as designed and shut off the flow of water.

In accordance with a preferred embodiment, four equally spaced inwardly projecting rails 50 are provided at positions about the circumference of the interior wall 27 of the housing 26. Each of the inwardly projecting rails 50 extends substantially the entire length of the housing 26.

Associated with the inwardly projecting rails 50 are static projections 52, as discussed above, that extend along an axis substantially parallel to that of the associated inwardly projecting rail 50. However, the static projections 52 only extend along a portion of the housing 26 adjacent the outlet end 38 thereof and the projections extend further into the housing 26. In particular, each static projection 52 extends from the outlet end 38 adjacent the valve seat 44 of the housing 26 to a position approximately in line with the adjustable stop member 42. The two static projections 52 and the adjustable stop member 42 represent three points of a plane that supports the compressible ball 34. The adjustable stop member 42, when screwed in or out changes the opening that supports the compressible ball 34. The larger the opening (the more the adjustable stop member 42 is screwed out) the less pressure or flow is required to push the compressible ball 34 past the three points of the plane supporting the compressible ball 34. Without the static projections 52 and rails 50, the compressible ball 34 would slip along the interior wall 27 of the housing 26, and uniform control could not be attained.

During proper operation, should a sprinkler head 14a or low volume drip hose 14b be removed or broken, the flow of water greatly increases and the flow force of the water will push the compressible ball 34 past the adjustable stop member 42 and the static projections 52 when they are properly adjusted. Once past the adjustable stop member 42 and the static projections 52, the compressible ball 34 seats against the valve seat 44 and blocks the opening to stop water flow to the outbound upper horizontal pipe 20 and in turn to the broken or removed water distribution member 14.

The ball stop assembly 40 is adjusted and set into proper operating position by using a broken water distribution member 14 connected thereto. Specifically, water is turned on and the adjustable stop member 42 is screwed out of the housing 26 to decrease the distance it extends into the interior of housing 26 until the compressible ball 34 is allowed to sufficiently compress so as to pass freely past the adjustable stop member 42 and the two static projections 52, and seats itself against the annular valve seat 44 in outlet end 38. It then becomes a simple matter to turn the water off, and force the compressible ball 34 back past the ball stop assembly 40 to the upstream position where it is ready to use again after a properly functioning sprinkler head 14a, or other irrigating device, replaces the broken head. The compressible ball 34 can be repositioned to its upstream position behind the ball stop assembly 40 by applying pressure with a suitable tool inserted through a union 11 connecting the outbound upper horizontal pipe 20 to the shut-off control device 10. The union 11 functions the same as the end of a garden hose when it is attached to a spigot. The rotating part of the union 11 is unscrewed from the shut-off control device 10 and then pushed slightly aside, enough to get a screw driver or pliers' handle inserted into the outlet end 38 of the shut-off control device 10 to push the compressible ball 34 back past ball stop assembly 40. The union 11 is then placed back onto the shut-off control device 10 by rotating in the opposite direction and the broken sprinkler head 14a, or low volume drip hose 14b, is repaired and/or replaced. The union 11 is a standard plumbing device well known in the art.

If the sprinkler head 14a or low volume drip hose 14b is broken in the future and a similar water distribution member is used to replace it, no further adjustments are necessary. Should a different sprinkler head or low volume drip hose be used, the force needed to cause the compressible ball 34 to actuate should be retested as explained above and readjusted if necessary.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A shut-off control device for a fluid flow line for automatically shutting off fluid flow in response to a predetermined increase in force of fluid flow, comprising:
    a housing having an interior flow path including an inlet end and an outlet end;
    a valve seat located at the outlet end;
    a ball stop assembly located in the housing spaced between the inlet end and the outlet end, wherein the ball stop assembly includes an adjustable stop member and a plurality of projections positioned between the inlet end and the outlet end of the housing and only extend along a portion of the housing from adjacent the outlet end to a position approximately in line with the adjustable stop member, and wherein the adjustable stop member extends through the housing from an exterior of the housing to an interior of the housing for adjustment thereof from the exterior of the housing;

a compressible ball located in the interior flow path in the housing and being positioned during normal operation behind the ball stop assembly at the inlet end; and whereby a predetermined fluid flow force will cause the compressible ball to be compressed to a shape and size allowing the compressible ball to pass through an opening in the ball stop assembly and engage the valve seat at the outlet end stopping fluid flow through the shut-off control device; and wherein the housing includes an interior wall having inwardly projecting rails extending substantially an entire length of the housing and shaped and dimensioned to support the compressible ball as it moves past the ball stop within the housing by limiting side-to-side motion or the turbulence of the compressible ball to stabilize the compressible ball within the housing such that upon activation the compressible ball is stable and it can react as designed to shut off the flow of water out of the shut-off control device.

2. The shut-off control device according to claim 1, wherein each of the plurality of projections extends along an axis substantially parallel to the inwardly projecting rails.

3. The shut-off control device according to claim 1, wherein the housing is cylindrical.

4. An irrigation system, comprising:

including at least one water distribution member;

a water supply source:

a horizontally oriented, shut-off control device located in a fluid flow line between a water supply source and the at least one water distribution member for automatically shutting off the flow of supply water to the at least one water distribution member in response to a predetermined increase in force of fluid flow;

the shut-off control device including a housing having an interior flow path including an inlet end and outlet end; a valve seat located at the outlet end; a ball stop assembly located in the housing spaced between the inlet end and the outlet end, wherein the ball stop assembly includes a adjustable stop member and a plurality of projections positioned between the inlet end and the outlet end of the housing and only extend along a portion of the housing from adjacent the outlet end to a position approximately in line with the adjustable stop member and wherein the adjustable stop member extends through the housing from an exterior of the housing to an interior of the housing for adjustment thereof from the exterior of the housing; a compressible ball located in the interior flow path in the housing and being positioned during normal operation behind the ball stop assembly at the inlet end; and whereby a predetermined fluid flow force will cause the compressible ball to be compressed to a shape and size allowing the compressible ball to pass through an opening in the ball stop assembly and engage the valve seat at the outlet end stopping fluid flow through the shut-off control device; and wherein the housing includes an interior wall having inwardly projecting rails extending substantially an entire length of the housing and shaped and dimensioned to support the compressible ball as it moves past the ball stop within the housing by limiting side-to-side motion or the turbulence of the compressible ball to stabilize the compressible ball within the housing such that upon activation the compressible ball is stable and it can react as designed to shut off the flow of water out of the shut-off control device.

5. The irrigation system according to claim 4, wherein the at least one water distribution member is a sprinkler.

6. The irrigation system according to claim 4, wherein the at least one water distribution member is a drip hose.

7. The irrigation system according to claim 4, wherein each of the plurality of projections extend along an axis substantially parallel to the inwardly projecting rails.

8. The irrigation system according to claim 4, wherein the housing includes a longitudinal axis which is horizontally oriented.

9. The irrigation system according to claim 4, wherein the inwardly projecting rails extend substantially an entire length of the housing.

10. The irrigation system according to claim 4, wherein the housing is cylindrical.

\* \* \* \* \*